United States Patent [19]
Ekholm et al.

[11] Patent Number: 5,762,760
[45] Date of Patent: Jun. 9, 1998

[54] REACTOR FOR TREATING PULP WITH A GAS

[75] Inventors: Rolf Ekholm; Ulf Jansson, both of Karlstad, Sweden

[73] Assignee: Kvaerner Pulping AB, Sweden

[21] Appl. No.: 817,587

[22] PCT Filed: Oct. 24, 1995

[86] PCT No.: PCT/SE95/01257

§ 371 Date: Apr. 17, 1997

§ 102(e) Date: Apr. 17, 1997

[87] PCT Pub. No.: WO96/15316

PCT Pub. Date: May 23, 1996

[30] Foreign Application Priority Data

Nov. 15, 1994 [SE] Sweden .................. 9403921

[51] Int. Cl.$^6$ .................. D21C 9/10; D21C 7/08; B01D 19/00
[52] U.S. Cl. .................. 162/246; 162/243; 422/135; 422/270; 96/155
[58] Field of Search .................. 162/246, 243, 162/17, 52, 57, 63, 233, 237; 422/129, 135, 136, 261, 269, 270; 95/261; 69/219, 155

[56] References Cited

U.S. PATENT DOCUMENTS

| | | | |
|---|---|---|---|
| 4,362,536 | 12/1982 | Gullichsen | .................. 95/261 |
| 4,410,337 | 10/1983 | Gullichsen et al. | .................. 95/22 |

FOREIGN PATENT DOCUMENTS

| | | |
|---|---|---|
| 0067148 | 12/1982 | European Pat. Off. . |
| WO 9013344 | 11/1990 | WIPO . |
| WO 9203611 | 3/1992 | WIPO . |

*Primary Examiner*—Stanley S. Silverman
*Assistant Examiner*—Jose A. Fortuna
*Attorney, Agent, or Firm*—Fasth Law Firm; Rolf Fasth

[57] ABSTRACT

The reactor comprises a pressurized vessel having an outlet member at its top and further including a blow line. The outlet member includes a housing that is in fluid communication with the vessel and to which the blow line is connected. A rotor is arranged in the housing for urging pulp in a direction of an inner side of the housing so that the pulp is discharged to the blow line while gas accumulates in the center of the housing. An outlet line is in fluid communication with an outlet channel for removing the gas from the center of the housing.

5 Claims, 2 Drawing Sheets

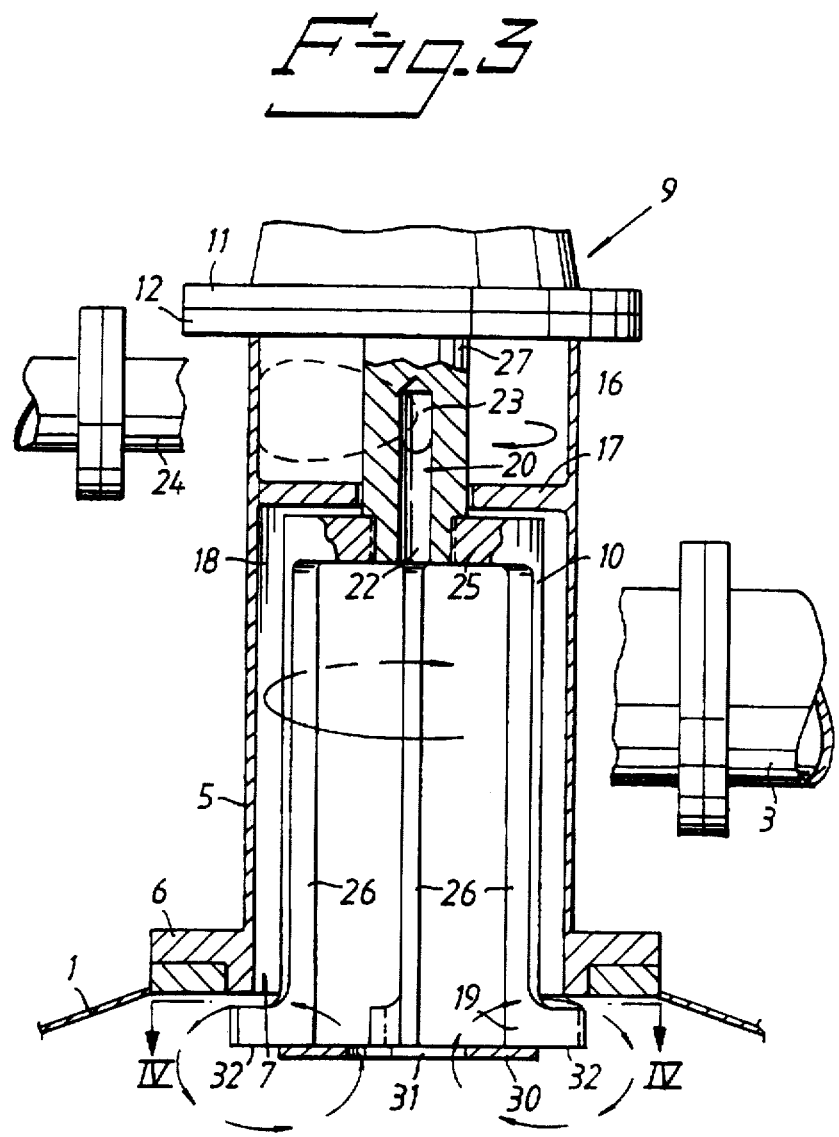
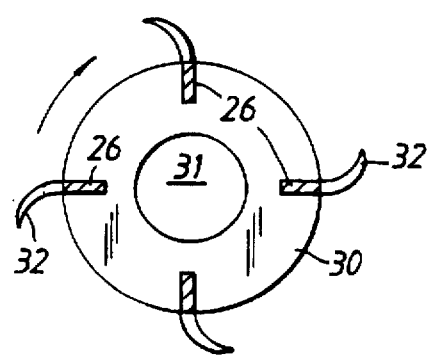

REACTOR FOR TREATING PULP WITH A GAS

TECHNICAL FIELD

The present invention relates to a reactor for treating a pulp with a gas, comprising a pressurized vertical vessel and an outlet member at the top of the vessel and comprising a blow line for transferring gas-treated pulp to a blow vessel.

BACKGROUND AND SUMMARY OF THE INVENTION

Pulp is treated in a known manner with a gas in a reactor vessel and is discharged from the top of the reactor vessel to a blow tank, via a blow line provided with a valve, together with high contents of residual gas which usually consists of unreacted treatment gas and possibly carrier gas. A problem which often arises during this discharging from the pressurized reactor vessel is that shocks and vibrations occur in the blow line. The reason is that the pulp and the residual gas are not homogeneously mixed as they pass through the blow line. The drop in pressure across the blow valve for a constant flow is essentially dependent on the ratio between pulp and gas. Since there are instantaneous variations in this ratio, this therefore means that there are instantaneous changes in the flow velocity in the blow line. All such changes in the flow velocity in a pipe system involve changes in the motional impulse of the pulp, which causes so-called pressure shocks.

The object of the present invention is to provide a reactor with outlet member which substantially reduces the above-mentioned problems.

The reactor according to the invention is characterized in that the outlet member comprises a cylindrical housing which is in open communication with the vessel and to which the said blow line is connected; a rotor rotating in the housing for separating gas and pulp from each other by means of the rotor being arranged to throw pulp in the direction of the inner side of the housing in order to be discharged to the blow line, while gas accumulates in the centre of the housing; a drive unit for driving the rotor via its rotor shaft; and a gas outlet system which comprises an outlet channel which extends through the rotor shaft from the centre of the rotor, and an outlet line which is in communication with the said outlet channel for removal of gas from the centre of the housing.

BRIEF DESCRIPTION OF THE DRAWING

The invention will be described in greater detail with reference to the drawings.

FIG. 3 is a sectional view of an outlet member according to a second embodiment.

FIG. 4 is a view corresponding to the line IV—IV in FIG. 3.

DETAILED DESCRIPTION

Figure 1:
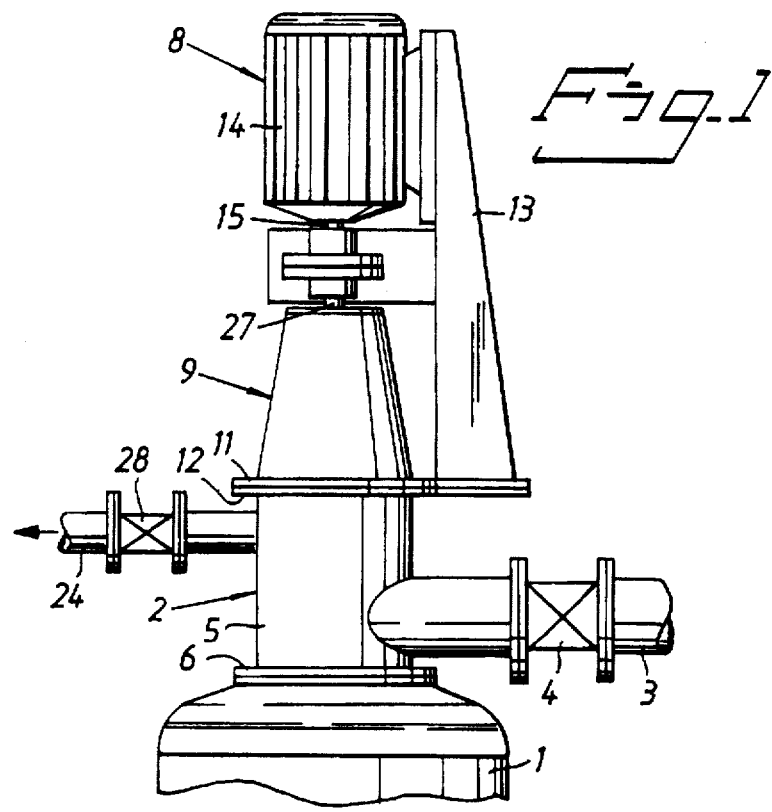
FIG. 1 is a side view of the upper part of a reactor according to the invention.
Figure 2:
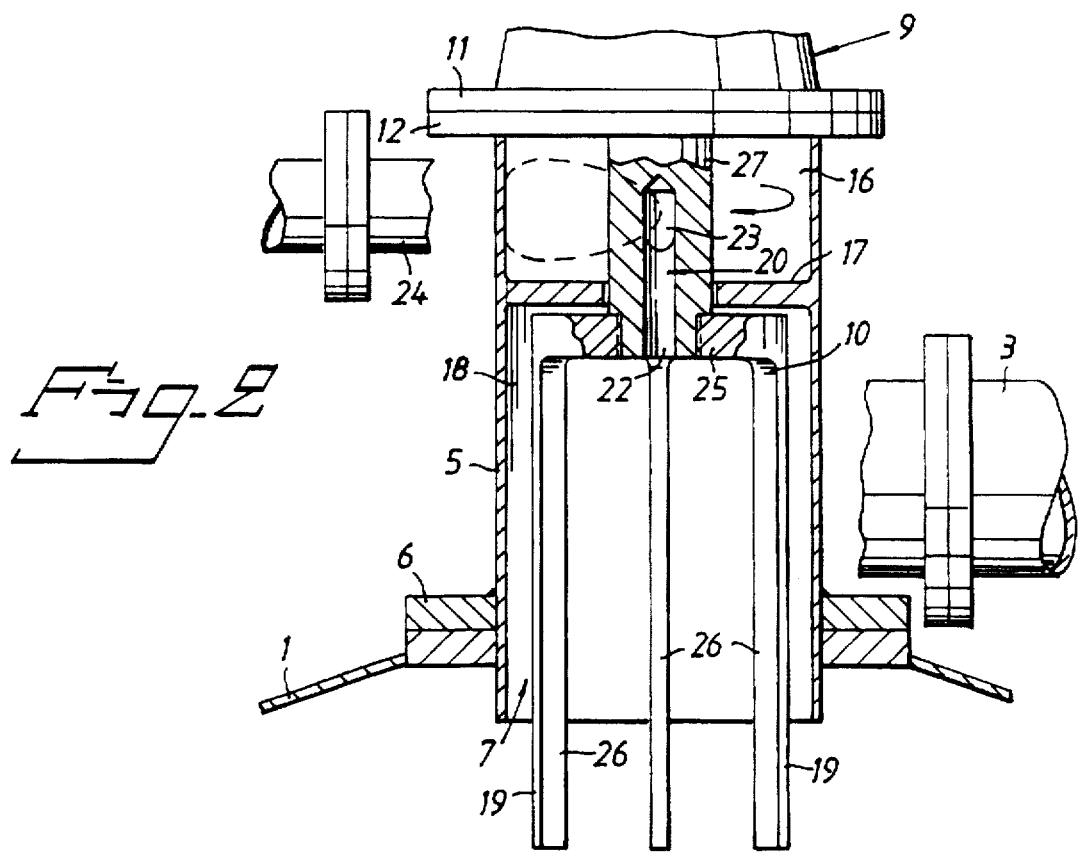
FIG. 2 is a sectional view of the outlet member of the reactor shown in FIG. 1 according to a first embodiment.

Referring to FIG. 1, the latter shows an upper portion of a reactor which has a vertical vessel 1 and an outlet member 2 which is connected to the top of the vessel and which comprises a blow line 3 which is connected to a blow vessel (not shown). The blow line 3 has a valve 4. The outlet member 2 moreover comprises a cylindrical housing 5 which is securely mounted by means of a lower flange 6 on the top of the reactor vessel 1. As is shown in greater detail in FIG. 2, the housing 5 is mounted in association with an outlet opening 7 in the reactor vessel 1 so that the reactor vessel 1 is in open communication with the housing 5. The outlet member 2 additionally has a drive unit 8, a bearing and sealing unit 9 and a rotor 10 (FIG. 2). The bearing and sealing unit 9 is securely mounted by means of a lower flange 11 on an upper flange 12 of the housing 5. The drive unit 8 is supported by a stand 13 which is connected securely to the lower flange 11 of the bearing and sealing unit 9. The drive unit 8 has an electric motor 14 which does, for example, about 1500 rpm, and a drive shaft 15 which is connected to a shaft 27 of the rotor, which rotor shaft is coaxial with the vertical centre line of the reactor vessel and extends through the bearing and sealing unit 9, through an upper space 16 and through a horizontal partition wall 17 which divides the housing 5 into the said upper space 16 and a lower space 18 which is considerably larger than the upper space 16. The rotor 10 is arranged in the lower space 18 of the housing in order to rotate in the direction indicated by an arrow. As is shown in greater detail in FIG. 2, the lower free end portion 19 of the rotor 10 is expediently situated inside the reactor vessel 1. An outlet channel 20 in the rotor shaft 27 connects the lower space 18 of the housing to the upper space 16 of the housing, which outlet channel 20 comprises a lower axial central part 22 and an upper radial part 23. A line 24 for gas is connected to the upper space 16 of the housing, while the blow line 3 principally for pulp is connected to the lower space 18 of the housing at a position near the partition wall 17.

The rotor 10 has a hub 25 for its connection to the rotor shaft 27 and a plurality of axial wings 26, preferably at least four, which extend outwards from the peripheral area of the hub through the lower space 18 of the housing and into the reactor vessel 1 by an appropriate distance.

The lines 3, 24 are preferably connected tangentially to the housing 5.

The described outlet member 2 functions in the following manner. The pulp mixed with gas is fed upwards through the reactor vessel 1 and into the housing 5, as is indicated by flow arrows. Under the action of the rotor wings 26, gas is separated from the pulp so that gas accumulates in the centre of the lower space 18 of the housing and a pulp with a reduced gas content is thrown radially outwards in the direction of the inner side of the housing in order then to be pressed out through the tangential blow line. The pulp is thus thrown radially outwards by the rotor wings 26 so that a pulp with a reduced gas content accumulates at the periphery in the lower space 18 of the housing, while gas accumulates in the central part thereof. The pulp with reduced gas content which is obtained continuously in this way is pressed into the blow line 3 and onwards to the blow tank, while the separated gas is conveyed through the channel 20 in the rotor shaft to the upper space 16 of the housing and onwards to the gas line 24. The gas line 24 can be connected to the said blow tank, but if the separated gas consists of or contains unreacted treatment gas, the gas may advantageously be returned to the treatment gas store for renewed use. The arrangement according to the invention, which has been described, provides for an advantageous separation of gas from pulp so that it becomes possible to discharge pulp and gas by separate routes and in uniform flows. The risk of the said pressure shocks occurring is correspondingly reduced. A further advantage is that the valve 4, 28 of the respective line can be adapted better to the physical properties of the medium flowing through it.

Referring to FIG. 3, the latter shows a second embodiment of an outlet member 2 according to the present invention which is similar to that according to FIGS. 1 and 2, except for the design of the rotor. The same reference numbers are used to designate the same or similar elements. In this second embodiment, the rotor 10 is provided with a plane circular coaxial ring 30 which has a central outlet opening 31 through which pulp flows into the housing 5. The ring 30 is welded securely to the lower end of each rotor wing 26 and functions as a throttle for the pulp. At its lower end part, which is situated in the reactor vessel 1, the rotor 10 is provided with a plurality of pump blades 32. In the preferred embodiment which is shown, the pump blades 32 are formed by radial extensions of the rotor wings 26, which extensions are curved in the circumferential direction. The pump blades 32 are arranged to pump some of the pulp, which is pressed in through the central outlet opening 31 of the throttle 30, radially outwards and back into the reactor vessel so that an inner circulation of pulp is obtained which resembles a toroidal movement. By means of this inner circulation, the pulp is further agitated so that any excess of gas which is present internally at the periphery of the reactor vessel is given a further opportunity to mix with the pulp and react with unreacted fibres. The throttle 30 also has the function of augmenting the occurrence of a lower pressure inside the rotor 10 and thus of increasing the separation of gas from pulp which takes place in the lower space 18 of the housing, as has been described in relation to the first embodiment.

If the pulp discharged from the separating housing still contains gas in such a quantity that the problems mentioned in the introduction are not reduced to an acceptable extent, it is possible, according to the invention, to provide at least one additional rotor for renewed action on the pulp so that further gas is separated. A second gas-separating arrangement of this kind comprises a cylindrical housing similar to the one described first, and is connected via its inlet end to the pulp outlet of the first housing, either directly or via a short line, and is connected via its own pulp outlet to the blow line, a gas outlet being arranged in the same manner as in the case of the first gas-separating arrangement.

While the present invention has been described in accordance with preferred compositions and embodiments, it is to be understood that certain substitutions and alterations may be made thereto without departing from the spirit and scope of the following claims.

We claim:

1. A reactor for treating a pulp with a gas comprising:
  a pressurized vertical vessel having a top portion;
  an outlet member in operative engagement with the top portion of the pressurized vertical vessel, the outlet member comprising a cylindrical housing that is in fluid communication with the pressurized vertical vessel, the cylindrical housing having an inside;
  a blow line connected to the cylindrical housing and in fluid communication with the pressurized vertical vessel for transferring gas-treated pulp away from the cylindrical housing;
  a rotatable rotor disposed in the cylindrical housing for urging pulp radially outwardly so that the pulp is dischargeable out through the blow line and for urging gas radially inwardly towards a center portion of an upper space defined in the cylindrical housing;
  a drive unit in operative engagement with the rotor to rotate the rotor via a rotor shaft having one end attached to the drive unit and the opposite end attached to the rotor;
  a gas outlet system having an outlet channel defined in the rotor shaft, the outlet channel having an elongate central axial cavity portion extending inside the rotor shaft and a radial cavity portion extending radially outwardly from the elongate central axial cavity portion so that the radial cavity portion is in fluid communication with the upper space defined in the cylindrical housing;
  an outlet line connected to the gas outlet system and in fluid communication with the outlet channel for removing gas from the center portion of the upper space defined in the cylindrical housing; and
  a partition wall disposed inside the cylindrical housing to divide the upper space from a lower space defined inside the cylindrical housing, the lower space being larger than the upper space.

2. The reactor according to claim 1 wherein the rotor comprises a plurality of axial wings that are remotely positioned relative the center portion of the cylindrical housing so that a gap is defined between the axial wings and the inside of the cylindrical housing, each axial wing has a portion that extends into the pressurized vertical vessel.

3. The reactor according to claim 2 wherein a plurality of pump blades are attached to lower end portions of the axial wings and extend radially outwardly, the lower end portions extend into the pressurized vertical vessel, a plane circular disc is attached to an end of the rotor that is disposed in the pressurized vertical vessel, the disc has a central outlet opening defined therein through which pulp is flowable, one portion of the pulp is circulated back into the pressurized vertical vessel by the pump blades, the other portion of the pulp is conveyed into the cylindrical housing to be separated from the gas.

4. A reactor for treating a mixture of gas-treated pulp comprising:
  a pressurized vertical vessel having a top portion for receiving an upwardly flowing mixture of gas and pulp;
  an outlet member in operative engagement with the top portion of the pressurized vertical vessel, the outlet member comprising a cylindrical housing that is in fluid communication with the pressurized vertical vessel, the cylindrical housing having an inside and a top end;
  a partition wall disposed inside the cylindrical housing to divide an upper space defined inside the cylindrical housing from a lower space defined inside the cylindrical housing, the lower space being larger than the upper space;
  a bearing and sealing unit being secured to the top end of the cylindrical housing;
  a blow line connected to the cylindrical housing and in fluid communication the lower space of the cylindrical housing for transferring gas-treated pulp away from the lower space of the cylindrical housing;
  a rotatable rotor having rotor wings disposed in the lower space of the cylindrical housing for urging pulp radially outwardly towards the inside of the cylindrical housing so that the gas-treated pulp is dischargeable out through the blow line and for urging the gas radially inwardly towards a center portion of the upper space defined in the cylindrical housing to separate the gas from the pulp, a portion of the rotor wings extending into the pressurized vertical vessel;
  a drive unit in operative engagement with the rotor to rotate the rotor via a rotor shaft having one end attached to the drive unit and the opposite end attached to the rotor;

an outlet channel defined in the rotor shaft, the outlet channel having an elongate central axial cavity portion extending inside the rotor shaft and a radial cavity portion extending radially outwardly from the elongate central axial cavity portion so that the lower space is in fluid communication with the upper space defined in the cylindrical housing and the gas is urged into the outlet channel when the rotor is rotated to guide the gas from the lower space into the upper space; and an outlet line connected to the upper space of the cylindrical housing and in fluid communication therewith for removing gas from a center portion of the upper space defined in the cylindrical housing.

5. The reactor according to claim 4 wherein the rotor wings have a lower end including pump blades that extend into the pressurized vertical vessel and a circular disc is attached to the lower end of the rotor wings, the circular disc has an opening defined therein to receive the mixture of gas and pulp, the pump blades pumps a portion of the pulp from the lower space back into the pressurized vertical vessel.

* * * * *